United States Patent
Zhu et al.

(10) Patent No.: US 10,151,873 B2
(45) Date of Patent: Dec. 11, 2018

(54) SINGLE MODE OPTICAL FIBER WITH ULTRA-LOW ATTENUATION AND BEND INSENSIBILITY

(71) Applicant: YANGTZE OPTICAL FIBRE AND CABLE JOINT STOCK LIMITED COMPANY, Wuhan, Hubei (CN)

(72) Inventors: Jihong Zhu, Hubei (CN); Lei Zhang, Hubei (CN); Shengya Long, Hubei (CN); Jun Wu, Hubei (CN); Liang Al, Hubei (CN); Ruichun Wang, Hubei (CN)

(73) Assignee: YANGTZE OPTICAL FIBRE CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/862,099

(22) Filed: Jan. 4, 2018

(65) Prior Publication Data
US 2018/0128967 A1    May 10, 2018

Related U.S. Application Data

(63) Continuation of application No. PCT/CN2015/096104, filed on Dec. 1, 2015.

(30) Foreign Application Priority Data

Jul. 31, 2015   (CN) .......................... 2015 1 0462611

(51) Int. Cl.
*G02B 6/028*   (2006.01)
*G02B 6/02*    (2006.01)
(Continued)

(52) U.S. Cl.
CPC ......... *G02B 6/02009* (2013.01); *G02B 1/046* (2013.01); *G02B 6/02028* (2013.01);
(Continued)

(58) Field of Classification Search
CPC .. G02B 6/0281; G02B 6/02009; G02B 1/046; G02B 6/02028; G02B 6/02219
(Continued)

(56) References Cited

U.S. PATENT DOCUMENTS

| 6,917,740 B2 | 7/2005 | Boek et al. |
| 2003/0026566 A1* | 2/2003 | Diep .................. G02B 6/02014 385/123 |

(Continued)

FOREIGN PATENT DOCUMENTS

| CN | 102276144 A | 12/2011 |
| CN | 102603179 A | 7/2012 |

(Continued)

OTHER PUBLICATIONS

Office Action issued by the State Intellectual Property Office of the Peoples Republic of China dated Jun. 29, 2016 for CN 201510462611.2.

(Continued)

*Primary Examiner* — Kaveh C Kianni
*Assistant Examiner* — Hung Lam
(74) *Attorney, Agent, or Firm* — Tim Tingkang Xia, Esq.; Locke Lord LLP

(57) ABSTRACT

An optical fiber with ultra-low attenuation and bend insensitivity includes a core layer and cladding layers. The cladding layers have an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The core layer has a radius of 3.0-3.9 μm, and a relative refractive index difference of −0.04% to 0.12%. The inner cladding layer has a radius of 8-14 μm, and a relative refractive index difference of about −0.35% to −0.10%. The trench cladding (Continued)

layer has a radius of about 14-20 µm, and a relative refractive index difference of about −0.6% to −0.2%. The auxiliary outer cladding layer has a radius of about 35-50 µm, and a relative refractive index difference of about −0.4% to −0.15%. The outer cladding layer is a pure silicon-dioxide glass layer.

9 Claims, 1 Drawing Sheet

(51) Int. Cl.
    *G02B 6/036*     (2006.01)
    *G02B 1/04*     (2006.01)

(52) U.S. Cl.
    CPC ......... *G02B 6/02219* (2013.01); *G02B 6/036* (2013.01); *G02B 6/03683* (2013.01)

(58) Field of Classification Search
    USPC .................................. 385/123, 124, 126–128
    See application file for complete search history.

(56) References Cited

U.S. PATENT DOCUMENTS

| | | | | |
|---|---|---|---|---|
| 2005/0262876 | A1* | 12/2005 | Jourdier | C03B 37/01291 65/391 |
| 2007/0077016 | A1* | 4/2007 | Bickham | G02B 6/02242 385/128 |
| 2011/0064368 | A1* | 3/2011 | Bookbinder | G02B 6/0365 385/123 |
| 2011/0085770 | A1* | 4/2011 | Bigot-Astruc | G02B 6/0365 385/123 |
| 2011/0188826 | A1* | 8/2011 | Sillard | G02B 6/02019 385/127 |
| 2012/0106909 | A1* | 5/2012 | Bickham | G02B 6/02019 385/124 |

FOREIGN PATENT DOCUMENTS

| | | |
|---|---|---|
| CN | 102645699 A | 8/2012 |
| CN | 103454719 A | 12/2013 |
| CN | 104749691 A | 7/2015 |
| CN | 104765098 A | 7/2015 |
| CN | 104777553 A | 7/2015 |
| CN | 104991306 A | 10/2015 |
| WO | 2010088482 A1 | 8/2010 |

OTHER PUBLICATIONS

Office Action issued by the State Intellectual Property Office of the Peoples Republic of China dated Jan. 26, 2017 for CN 201510462611.2.

International Search Report (ISR) issued by the State Intellectual Property Office of the Peoples Republic of China dated Apr. 22, 2016 for PCT/CN2015/096104, China.

* cited by examiner

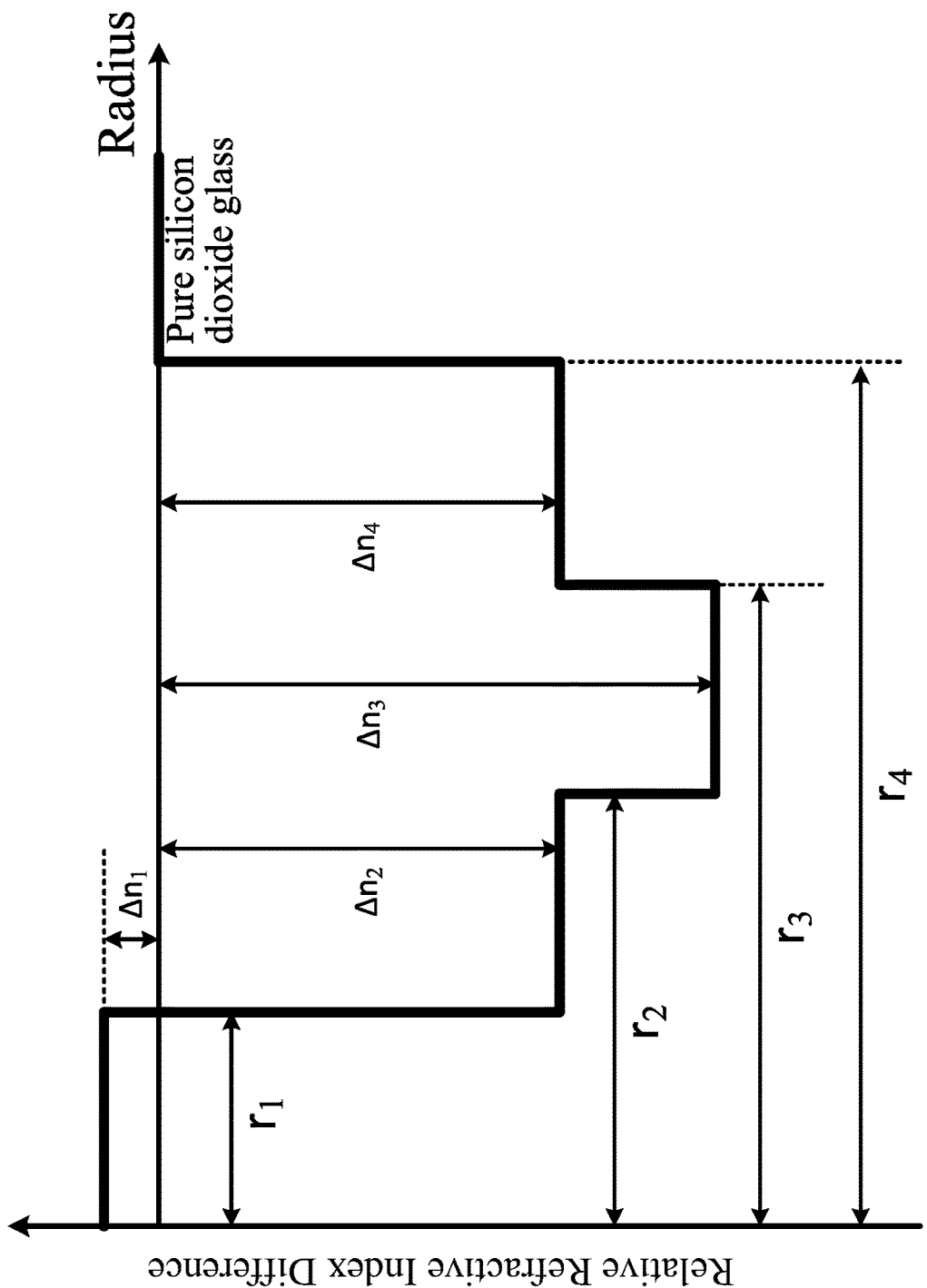

SINGLE MODE OPTICAL FIBER WITH ULTRA-LOW ATTENUATION AND BEND INSENSIBILITY

CROSS-REFERENCE TO RELATED APPLICATIONS

This application is a continuation application of International Patent Application No. PCT/CN2015/096104, filed Dec. 1, 2015, which itself claims priority to Chinese Patent Application No. 201510462611.2, filed Jul. 31, 2015 in the State Intellectual Property Office of P.R. China, which are hereby incorporated herein in their entireties by reference.

FIELD OF THE INVENTION

The present invention relates generally to an optical fiber, and more particularly, to a single-mode optical fiber having an ultra low attenuation and excellent bend insensitivity, and a mode field diameter compatible with the G.657.A2 standard.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Optical communications have been widely applied in a long-distance trunk network to a metropolitan area network and an access network due to the characteristics of large capacity, long transmission distance, high transmission speed, economy and the like. Development objectives of an optical fiber communication technology always aim at higher transmission rate, larger capacity and longer transmission distance, so as to continuously increase and improve performance indexes of an optical fiber and a communication technology of the optical fiber. Especially in recent years, with the explosive increase of IP service traffic, a communication network is stepping to the direction of next-generation sustainable development, and construction of an optical fiber infrastructure having a great transmission capacity is a physical foundation of a next-generation network. In order to meet development requirements of an optical fiber communication system, relevant performance indexes of an optical fiber serving as an optical fiber communication network transmission medium also need to be further improved.

Attenuation coefficient of optical fiber is one of the most important performance of the optical fiber, which determines a repeater distance of optical fiber communications to a great extent. As the attenuation coefficient of the optical fiber is smaller, a transmittable distance of an optical signal carried therein is longer. Under the same transmission distance, the attenuation amplitude of the optical signal carried therein is smaller. Reduction of the attenuation coefficient can effectively improve an OSNR (Optical Signal to Noise Ratio) in the optical fiber communications, thus increasing the transmission quality and transmission distance of a system. In a long-distance optical fiber communication, an optical signal is transmitted via a repeater station. If the attenuation coefficient of the optical fiber is smaller, a repeaterless transmission distance of the optical signal will be longer, so the distance between repeater stations can be increased, thereby greatly reducing arrangement of the repeater stations and reducing the operation cost. Therefore, regardless of optimization of a system structure or reduction of the operation cost, reduction of the attenuation coefficient of the optical fiber plays a very important role. On the other hand, with the continuous development of FTTX in recent years, the performance of an original G.652 optical fiber has been difficult to meet requirements of users, and a practical application environment requires an optical fiber to have certain bend resistance performance. So, on the basis of the G.652 optical fiber, a new-generation bend-insensitive single-mode optical fiber, namely a G.657 optical fiber, is developed, including a G.657.A-class optical fiber compatible with the G.652 standard and a G.657.B-class optical fiber not compatible with the G.652 standard. The G.657.A-class optical fiber is well compatible with a G.652.D optical fiber, possesses better bend resistance performance as compared to a common G.652.D optical fiber, and is thus regarded as one of products which most probably replace a conventional G.652 optical fiber. Hence, a new-generation of a single-mode optical fiber compatible with the G.652 standard and with lower attenuation, a relatively large mode field diameter and bend insensitivity becomes a research focus in the field of communication optical fibers.

In a manufacturing process of an optical fiber preforming bar, the optical fiber attenuation can be reduced by generally adopting the following methods. For example, higher-purity raw materials are adopted, so as to improve the sealing performance of a production environment and equipment, and to reduce the introduction probability of external impurities. For example, in Chinese Patent Application No. CN201110178833.3, a method of improving the air tightness of a deposition process of an optical fiber preforming bar is adopted, so as to reduce introduction of the external impurities. Or, a manufacturing process of a preforming bar with a larger outer diameter is adopted, and the overall attenuation of an optical fiber is reduced by means of a dilution effect of a large-size preforming bar. In addition, in a manufacturing process of the optical fiber, a coating process for a bare optical fiber surface coating is also an important factor which influences the attenuation performance of the optical fiber. However, no matter from the perspective of cost and process control in theoretical optical fiber preparation or from the perspective of cost and process control in actual optical fiber preparation, reducing doping of the optical fiber and optimizing the section of the optical fiber are simple and effective methods for reducing the optical fiber attenuation. Generally speaking, as the concentration of a doping material is lower, losses caused by Rayleigh scattering will be smaller. In a traditional single-mode optical fiber, in order to ensure a total reflection in the optical fiber, a sufficient refractive index difference value between a core layer and an inner cladding must be ensured, the relative refractive index of the core layer being much larger than that of the inner cladding of the optical fiber. In order to ensure the design, doping of Ge or co-doping of Ge/F must be performed in the core layer to a large extent. In a traditional optical fiber section design, laser energy is distributed in an optical fiber section in a Gaussian distribution form, about 70% of the laser energy is propagated in a heavily-doped core layer part. That is, high-energy density laser transmission propagation is concentrated in a high-concentration doped core layer with a relatively large Rayleigh coefficient. If a section with energy in non-Gaussian distribution is designed by means of reasonable optical section design to reduce energy losses in the high-concentration doped core layer, the attenuation performance of the optical fiber can be significantly reduced.

However, in these conventional G.657 optical fiber section designing and manufacturing methods, Ge and F are co-doped in the core layer to a large extent. In order to obtain optimal macrobend performance, the relative refractive index of the core layer is larger than 0.35% generally, that is, Ge is doped in the core layer to a large extent, and therefore larger Rayleigh scattering will be caused so as to increase the attenuation of the optical fiber.

Chinese Patent Application No. CN201310394404 provides a design of an ultra low attenuation optical fiber. The ultra low attenuation optical fiber is designed with a pure silica outer cladding. However, the ultra low attenuation optical fiber adopts a typical step section structure instead of a trench cladding for optimizing bending of the optical fiber, and a core layer of the ultra low attenuation optical fiber is not doped with Ge. Therefore, viscosity mismatch during preparation of a preforming bar may be caused, and it can be found out that the attenuation and bending levels are relatively poor.

Attenuation of a quartz optical fiber in a range of 600 nm to 1600 nm mainly comes from Rayleigh scattering, and the attenuation $\alpha_R$ caused by the Rayleigh scattering can be calculated according to the following formula:

$$\alpha_R = \frac{1}{\lambda^4} \int_0^{+\infty} R(r)P(r)rdr \Big/ \int_0^{+\infty} P(r)rdr = \frac{R}{\lambda^4} + B$$

In the formula, $\lambda$ is wavelength (μm), and R is Rayleigh scattering coefficient (dB/km/μm$^4$); P is light intensity; and when the Rayleigh scattering coefficient is confirmed, B is a corresponding constant. Therefore, as long as the Rayleigh scattering coefficient R is determined, the attenuation $\alpha_R$ (dB/km) caused by the Rayleigh scattering can be obtained. The Rayleigh scattering is caused by both density fluctuation and concentration fluctuation. Therefore, the Rayleigh scattering coefficient R can be expressed as:

$$R = R_d + R_c$$

In the above formula, $R_d$ and $R_c$ are respectively representative of variations of the Rayleigh scattering coefficient caused by the density fluctuation and the concentration fluctuation. Where $R_c$ is a concentration fluctuation factor, which is mainly influenced by the doping concentration of an optical fiber glass part. In theory, as fewer Ge and F or other elements are doped, $R_c$ is smaller. That is why certain foreign enterprises adopt pure silicon cores at present to achieve the ultralow attenuation performance.

However, it is important to note that the Rayleigh scattering coefficient further includes another parameter Rd. Rd is associated with a fictive temperature $T_F$ of glass, and varies along with the structure variation and temperature variation of the glass. The fictive temperature $T_F$ of the glass is a physical parameter representative of a glass structure, and is defined as a temperature corresponding to a certain state of equilibrium achieved from rapid cooling of the glass at a certain temperature T' to no more adjustment of the glass structure at room temperature. When $T'>T_F$ (softening temperature of glass), the glass structure is easy to adjust due to low viscosity of the glass, and therefore the glass is in a state of equilibrium at each moment, so $T_F = T'$; when $T'<T_g$ (transition temperature of glass), the glass structure is difficult to adjust due to high viscosity of the glass, and the structural adjustment of the glass lags behind the temperature variation, so $T_F > T'$; and when $T_g < T' < T_F$ (softening temperature of glass), time needed for making the glass tend to be equilibrated is shorter, and the time is associated with components of the glass and a cooling speed specifically, so $T_F > T'$ or $T_F < T'$.

During design with a pure silicon core, in order to ensure the total reflection of the optical fiber, an F-doped inner cladding with a lower refractive index must be used for matching, so as to ensure that a sufficient refractive index difference is maintained between the core layer and the inner cladding. So, the viscosity of the core layer part of the pure silicon core is relatively high, and meanwhile, the viscosity of the inner cladding part doped with a great number of F is relatively low, so as to cause viscosity mismatch of an optical fiber structure. Thus, the virtual temperature of the optical fiber with a pure silicon core structure rapidly rises to make $R_d$ of the optical fiber increase. So, not only advantages brought by $R_c$ reduction are canceled, but also the attenuation of the optical fiber may be reversely abnormal.

U.S. Pat. No. 6,917,740 discloses a pure silicon core optical fiber improved in performance by utilizing viscosity variation. A great number of F and Cl are doped in the core layer, Rayleigh coefficients of the optical fiber are reduced by utilizing contributions of F and Cl doping to the viscosity of the core layer, the section design for the optical fiber is not involved herein, and Ge is not doped in the core layer.

PCT Application No. PCT/US2010/022533 discloses a design of an optical fiber. In order to obtain a lower Rayleigh coefficient, pure silicon core design is adopted, germanium and fluorine are not co-doped in a core layer, and fluorine-doped silica is adopted to serve as an outer cladding. As for design of the pure silicon core, complicated viscosity matching must be performed inside the optical fiber, and an extremely low speed is required in a drawing process to avoid attenuation increase caused by defects inside the optical fiber due to high-speed drawing, so the manufacturing process is extremely complicated.

A common ultra low attenuation single-mode optical fiber is designed with an outer cladding fully doped with F. From the perspective of fiber optics, the design is relatively simple, and as long as a refractive index difference value between the outer cladding and the corer layer is ensured, requirements for total reflection of the optical fiber can be met. However, there are mainly two factors for limiting the manufacturing cost of the ultra low attenuation optical fiber at present: first, the size of a preforming bar purely doped with F is small, and a drawing process is complicated; and second, the manufacturing cost of an optical fiber purely doped with F is very high due to an F doping process. The price of an F-doped casing is 5 to 8 times that of a pure silica casing by means of preliminary estimate according to a current market price. On the basis of calculation according to a preliminary relationship that the cost of an F-doped material is 6 times that of a pure silica material, if a reasonable design process is adopted to appropriately reduce the thickness of an F-doped layer, the manufacturing cost of the optical fiber will be significantly reduced. If an F-doped material is merely used from 30 μm (diameter of the optical fiber) to 80 μm and common pure silica is used from 80 μm to 125 μm, this design reduces the material cost by 40% as compared to traditional design of an ultra low attenuation optical fiber with a fully doped F material. If an F-doped material is used from 30 µm to 60 µm and common pure silica is used from 60 µm to 125 µm, the material cost is reduced by 65%.

The above analysis shows a feasibility of performing process design on an ultra low attenuation optical fiber by using a non-pure silicon core and a partially doped fluorine cladding. However, due to influence of the foregoing two limitation factors, how to control optical parameters of an optical fiber under the design is a facing challenge.

If pure silica not doped with fluorine is used as an outer cladding material, 3 problems will be caused.

First, inhibition of fundamental mode cutoff: a refractive index difference value between the outer cladding material and the core layer material is too small, and leakage of an optical fiber fundamental mode will be caused, so as to influence the attenuation of the optical fiber. So, reasonable optical fiber section design must be adopted to inhibit leakage of the fundamental mode between the outer cladding and the core layer of the ultra low attenuation optical fiber with a non-F-doped outer cladding material.

Second, consideration of viscosity matching: if any viscosity optimization design is not made in the outer cladding material, the viscosity is mismatched with the viscosity gradient of the inner cladding and the core layer.

Third, consideration of optical section matching: if pure silica glass is used as the outer cladding material, the doping concentration of each part will be limited when viscosity matching design is considered. In order to ensure that optical parameters of the optical fiber meet parameter requirements of a G.652 or G.654 optical fiber, that is, to ensure that the MFD, dispersion and bending performance of the optical fiber meet standard requirements, optical section design must be taken into consideration. This requires taking the optical design of the optical fiber into comprehensive consideration during the viscosity design, thus increasing the difficulty of process implementation.

Therefore, a heretofore unaddressed need exists in the art to address the aforementioned deficiencies and inadequacies.

SUMMARY OF THE INVENTION

One of the objectives of the present invention is to provide a single-mode optical fiber with ultralow attenuation and bend insensitivity. The single-mode fiber has a lower optical fiber manufacturing cost, a lower attenuation coefficient and excellent bending performance.

In one aspect of the invention, the single-mode optical fiber with ultra low attenuation and bend insensitivity comprises a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The core layer has a radius $r_1$ in a range of about 3.0 to 3.9 µm, and a relative refractive index difference $\Delta n_1$ in a range of about −0.04% to 0.12%. The inner cladding layer has a radius $r_2$ in a range of about 8 to 14 µm, and a relative refractive index difference $\Delta n_2$ in a range of about −0.35% to −0.10%. The trench cladding layer has a radius $r_3$ in a range of about 14 to 20 µm, and a relative refractive index difference $\Delta n_3$ in a range of about −0.6% to −0.2%. The auxiliary outer cladding layer has a radius $r_4$ in a range of about 35 to 50 µm, and a relative refractive index difference $\Delta n_4$ in a range of about −0.4% to −0.15%. The outer cladding layer is a pure silicon dioxide glass layer.

In one embodiment, the core layer is a silicon dioxide glass layer co-doped with germanium fluorine and alkali metals, or a silicon dioxide glass layer co-doped with germanium and alkali metals, wherein a relative refractive index contribution $\Delta Ge$ of the germanium in the core layer is in a range of about 0.02% to 0.10%, preferably, in a range of about 0.04% to 0.08%. The doping quantity of the alkali metals is in a range of about 5 to 3000 ppm.

In one embodiment, the alkali metals in the core layer comprise one or more of lithium, sodium, potassium, rubidium, cesium and francium alkali metal ions.

In one embodiment, the single-mode optical fiber has a mode field diameter at a wavelength of about 1310 nm being in a range of about 8.4 to 9.1 µm, preferably, in a range of about 8.5 to 8.8 µm.

In one embodiment, the single-mode optical fiber has a cabling cutoff wavelength being equal to or smaller than 1260 nm.

In one embodiment, the single-mode optical fiber has a zero dispersion point being in a range of about 1300 to 1324 nm, and a zero dispersion slope being smaller than or equal to $0.092 \text{ ps}/(\text{nm}^2 \ast \text{km})$.

In one embodiment, the single-mode optical fiber has a dispersion at a wavelength of about 1310 nm being equal to or smaller than 18 ps/(nm*km).

In one embodiment, the single-mode optical fiber has an attenuation at a wavelength of about 1310 nm being equal to or smaller than 0.314 dB/km, preferably, being equal to or smaller than 0.300 dB/km.

In one embodiment, the single-mode optical fiber has an attenuation at a wavelength of 1550 nm being equal to or smaller than 0.174 dB/km, preferably, being equal to or smaller than 0.164 dB/km.

In one embodiment, the single-mode optical fiber has a microbending loss with a bend radius of R 15 mm for 10 circles at a wavelength of about 1550 nm being equal to or smaller than 0.03 dB, and the microbending loss with a bend radius of R 10 mm for 1 circle being equal to or smaller than 0.1 dB.

In one embodiment, the single-mode optical fiber has a diameter of about 250 µm or about 200 µm.

Among other things, the present invention has at least the following beneficial effects.

1. A core/cladding section structure of the optical fiber and internal viscosity matching of the optical fiber are reasonably designed, defects in a preparation process of the optical fiber are reduced, and attenuation parameters of the optical fiber are reduced.

2. Alkali metal doping is added into the core layer to optimize core layer viscosity, the core layer viscosity is controlled by the alkali metal ion doping in the core layer, and the external glass viscosity of the core layer is optimized by means of different fluorine doping concentrations of an inner cladding layer and a trench cladding layer, so as to reduce defects of an interface position and reduce the virtual temperature, thus reducing the attenuation of the optical fiber.

3. A optical fiber fluorine doping trench structure is properly designed. The optical fiber has a mode field diameter (MFD) equal to or larger than 8.4 µm by reasonably designing the each sections of the core and cladding layers of the optical fiber.

4. Comprehensive performance parameters such as cutoff wavelength, bend loss and dispersion of the optical fiber according to the invention are good at an application band, and the cable cutoff wavelength is small enough, so as to ensure a single-mode state of an optical signal of the optical fiber in C-band transmission application; the section of the optical fiber adopts a multilayer stepped trench cladding structure, the wider trench cladding structure is used to limit leakage of a fundamental mode, and the bend loss of the optical fiber is better improved; and the optical fiber can be compatible with the G.657.A2 standard.

5. An outer cladding structure at the outermost layer adopts pure silicon dioxide, so as to reduce the proportion of fluorine-doped glass in the optical fiber, thus reducing the manufacturing production cost of the optical fiber.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a diagram of a refractive-index profile structure distribution of an optical fiber according to an embodiment of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "ppm" refers to one-millionth by weight.

From a central axis of an optical fiber, according to changing of a refractive index, a layer closest to the axis is defined as a core layer, i.e., the core layer refers to a central area of a cross section of the fiber, and an outmost layer of the fiber, i.e., a pure silicon dioxide layer, is defined as an outer cladding layer of the fiber.

As used herein, a relative refractive index $\Delta n_1$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of the pure silicon dioxide without dopants of Ge or F.

A contribution of doped Ge in the core layer of the optical fiber to the refractive index $\Delta Ge$ is defined according to the following equation:

$$\Delta Ge = \frac{n_{Ge} - n_c}{n_c} \times 100\%,$$

where $n_{Ge}$ is an absolute refractive index of the silicon dioxide glass caused by the doped substance Ge doped in the core layer, provided that the doped substance Ge doped in the core layer is doped in the pure silicon dioxide that includes no other doped substance.

As defined in the IEC (International Electrotechnical Commission) standard 60793-1-44, a cable cutoff wavelength $\lambda_{cc}$ is a wavelength for which an optical signal no longer transmits as a single-mode signal after transmitting about 22 meters in a fiber. During a test, a fiber needs to be bent into a circle with a radius of about 14 cm and two circles with a radius of 4 cm to obtain data.

The description will be made as to the embodiments of the present invention in conjunction with the accompanying drawings. In accordance with the purposes of this invention, as embodied and broadly described herein, this invention, in one aspect, relates to a doping optimized single-mode optical fiber with ultra low attenuation.

According to one embodiment of the invention as shown in FIG. 1 the optical fiber includes a core layer and cladding layers surrounding the core layer. The core layer is a silicon dioxide glass layer co-doped with germanium fluorine and alkali metals, or a silicon dioxide glass layer co-doped with germanium and alkali metals. The alkali metals in the core layer include one or more of lithium, sodium, potassium, rubidium, cesium and francium alkali metal ions. The cladding layers have an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The outer cladding is a pure silicon dioxide glass layer, and the diameter of the outer cladding is 125 μm.

Table 1 lists parameters of the optical fiber according to the preferred embodiments of the present invention, where ΔGe is a refractive index contribution of Ge doping in the core layer, and K is the content of potassium in the core layer. Table 2 lists optical parameter properties corresponding to the optical fiber in the Table 1.

TABLE 1

Optical parameters of the optical fiber of embodiments of the invention

| Fiber No. | r1[μm] | Δn1[%] | ΔGe[%] | K[ppm] | r2[μm] | Δn2[%] | r3[μm] | Δn3[%] | r4[μm] | Δn4[%] |
|---|---|---|---|---|---|---|---|---|---|---|
| 1 | 3.5 | 0.04 | 0.07 | 300 | 10 | −0.25 | 13.5 | −0.52 | 42 | −0.2 |
| 2 | 3.7 | 0.03 | 0.02 | 100 | 11.2 | −0.33 | 15.5 | −0.4 | 48 | −0.38 |
| 3 | 3.6 | 0.01 | 0.06 | 200 | 12.1 | −0.25 | 15.5 | −0.45 | 45 | −0.4 |
| 4 | 3.1 | 0.02 | 0.05 | 500 | 11.1 | −0.24 | 14.5 | −0.38 | 38 | −0.36 |
| 5 | 3.2 | 0.1 | 0.1 | 300 | 9.2 | −0.15 | 14 | −0.38 | 41 | −0.18 |
| 6 | 3.8 | 0.04 | 0.05 | 2000 | 12.1 | −0.18 | 17 | −0.55 | 40 | −0.22 |
| 7 | 3.4 | 0 | 0.08 | 50 | 10.2 | −0.28 | 12.8 | −0.51 | 46 | −0.25 |
| 8 | 3.6 | 0.05 | 0.01 | 1000 | 12 | −0.21 | 18 | −0.45 | 47 | −0.27 |
| 9 | 3.2 | −0.03 | 0.03 | 400 | 8.5 | −0.32 | 13.7 | −0.58 | 44 | −0.38 |
| 10 | 3.4 | −0.02 | 0.02 | 900 | 12.2 | −0.21 | 19 | −0.5 | 42 | −0.3 |

TABLE 2

Optical fiber parameters of the optical fiber of embodiments of the invention

| Fiber No. | MFD@1310 [μm] | Cable Cutoff [nm] | Zero Disp [nm] | Att. @1310 nm [dB/km] | Att. @1550 nm [dB/km] | R15 mm 10turn Macrobending loss @1550 nm | R10mm 1turn Macrobending loss @1550 nm |
|---|---|---|---|---|---|---|---|
| 1 | 8.6 | 1242 | 1316 | 0.292 | 0.161 | 0.17 | 0.53 |
| 2 | 8.4 | 1209 | 1319 | 0.288 | 0.166 | 0.08 | 0.23 |
| 3 | 8.6 | 1231 | 1315 | 0.294 | 0.165 | 0.2 | 0.61 |
| 4 | 8.7 | 1240 | 1319 | 0.292 | 0.159 | 0.13 | 0.42 |
| 5 | 8.6 | 1221 | 1308 | 0.313 | 0.164 | 0.16 | 0.41 |
| 6 | 8.8 | 1252 | 1312 | 0.311 | 0.156 | 0.14 | 0.43 |
| 7 | 8.5 | 1232 | 1310 | 0.313 | 0.167 | 0.20 | 0.58 |
| 8 | 8.7 | 1247 | 1320 | 0.296 | 0.158 | 0.06 | 0.29 |
| 9 | 8.9 | 1240 | 1311 | 0.301 | 0.164 | 0.21 | 0.66 |
| 10 | 9 | 1238 | 1306 | 0.313 | 0.160 | 0.17 | 0.57 |

According to the present invention, a core/cladding section structure of the optical fiber and internal viscosity matching of the optical fiber are properly designed. Alkali metal doping is added into the core layer to optimize the core layer viscosity. The optical fiber not only has a low attenuation coefficient and excellent bending performance, but also can be compatible with the G657.A2 standard. The manufacturing cost of the optical fiber is low.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A single-mode optical fiber with ultra low attenuation and bend insensitivity, comprising:
a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer;
wherein the core layer has a radius $r_1$ in a range of about 3.0 to 3.9 μm, and a relative refractive index difference $\Delta n_1$ in a range of about −0.04% to 0.12%;
wherein the inner cladding layer has a radius $r_2$ in a range of about 8 to 14 μm, and a relative refractive index difference $\Delta n_2$ in a range of about −0.35% to −0.10%;
wherein the trench cladding layer has a radius $r_3$ in a range of about 14 to 20 μm, and a relative refractive index difference $\Delta n_3$ in a range of about −0.6% to −0.2%;
wherein the auxiliary outer cladding layer has a radius $r_4$ in a range of about 35 to 50 μm, and a relative refractive index difference $\Delta n_4$ in a range of about −0.4% to −0.15%; and
wherein the outer cladding layer is a pure silicon dioxide glass layer, and
wherein the core layer is a silicon dioxide glass layer co-doped with germanium fluorine and alkali metals, or a silicon dioxide glass layer co-doped with germanium and alkali metals, wherein a relative refractive index contribution $\Delta Ge$ of the germanium in the core layer is in a range of about 0.02% to 0.10%, and the doping quantity of the alkali metals is in a range of about 5 to 3000 ppm.

2. The single-mode optical fiber according to claim 1, having a mode field diameter at a wavelength of about 1310 nm being in a range of about 8.4 to 9.1 μm.

3. The single-mode optical fiber according to claim 1, having a cabling cutoff wavelength being equal to or smaller than 1260 nm.

4. The single-mode optical fiber according to claim 1, having a zero dispersion point of the optical fiber is in a range of 1300 to 1324 nm, and the zero dispersion slope of the optical fiber is smaller than or equal to 0.092 ps/(nm$^2$*km).

5. The single-mode optical fiber according to claim 1, having a dispersion at a wavelength of about 1310 nm being equal to or smaller than 18 ps/(nm*km).

6. The single-mode optical fiber according to claim 1, having an attenuation at a wavelength of about 1310 nm being equal to or smaller than 0.314 dB/km.

7. The single-mode optical fiber according to claim 1, having an attenuation at a wavelength of 1550 nm being equal to or smaller than 0.174 dB/km.

8. The single-mode optical fiber according to claim 1, having a microbending loss with a bend radius of R 15 mm for 10 circles at a wavelength of about 1550 nm being equal to or smaller than 0.03 dB, and the microbending loss with a bend radius of R 10 mm for 1 circle being equal to or smaller than 0.1 dB.

9. The single-mode optical fiber according to claim 1, wherein the alkali metals in the core layer comprise one or more of lithium, sodium, potassium, rubidium, cesium and francium alkali metal ions.

* * * * *